Patented Nov. 28, 1922.

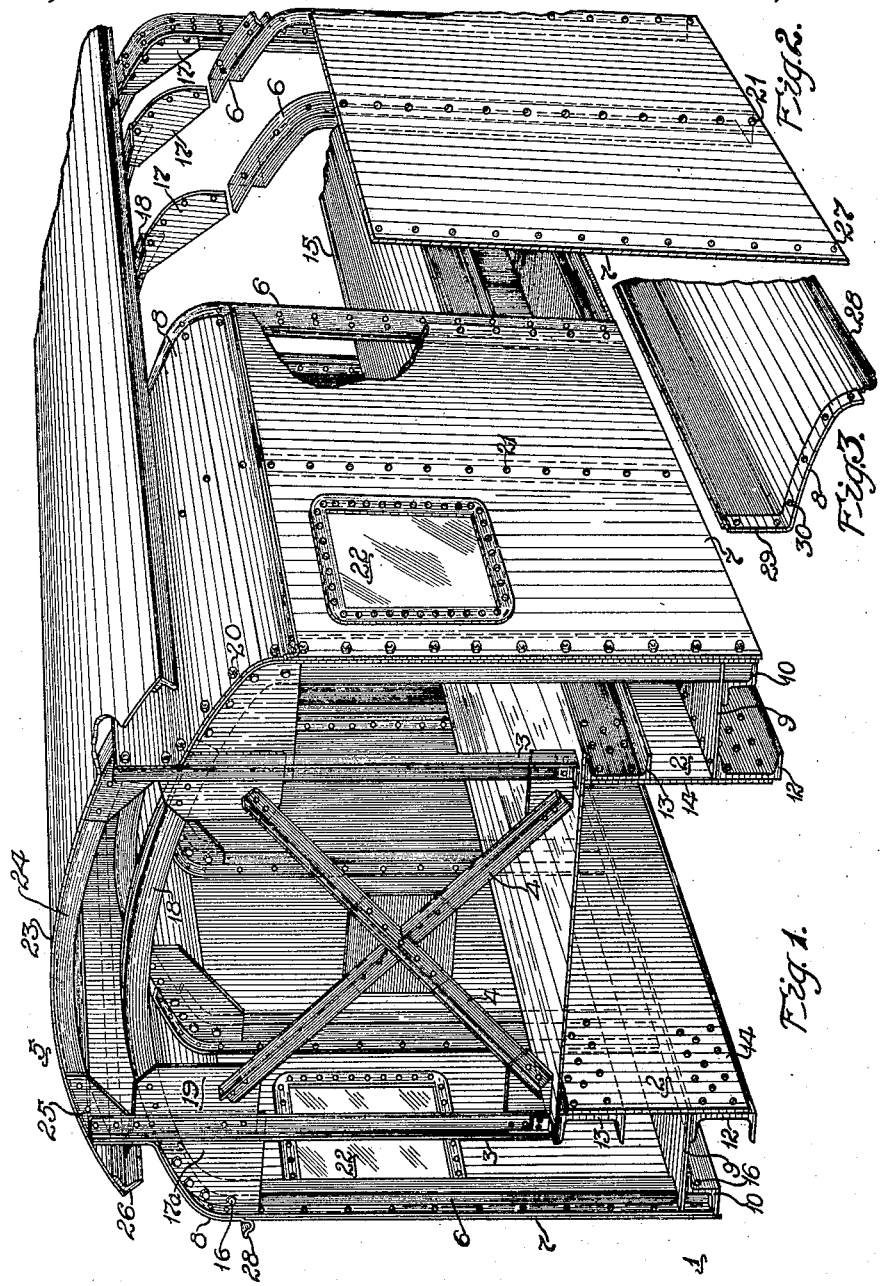

1,437,078

UNITED STATES PATENT OFFICE.

VICTOR J. SHEPARD, OF PITTSBURGH, PENNSYLVANIA, ASSIGNOR TO WESTINGHOUSE ELECTRIC & MANUFACTURING COMPANY, A CORPORATION OF PENNSYLVANIA.

LOCOMOTIVE-CAB CONSTRUCTION.

Application filed June 17, 1920. Serial No. 389,617.

*To all whom it may concern:*

Be it known that I, VICTOR J. SHEPARD, a citizen of the United States, and a resident of Pittsburgh, in the county of Allegheny and State of Pennsylvania, have invented a new and useful Improvement in Locomotive-Cab Constructions, of which the following is a specification.

My invention relates to locomotive cabs and it has particular relation to cabs in which electrical apparatus or machinery is mounted.

The object of my invention is to provide a railway cab of simple, economical and durable construction, the sides of which may be readily removed to permit the installation, repair or removal of electrical apparatus and machinery employed to operate an electric locomotive.

Heretofore, it has been customary to install and remove electrical and mechanical equipment of an electric locomotive by removing the roof of the cab and lowering or raising the equipment through the opening thus provided. The disadvantage of this method is that one or more cranes may be required to remove apparatus which could be brought in place by means of trucks if the sides of the car were removed and the equipment deck were on the same level as the adjacent platforms.

By means of my invention, I provide a railway cab which has its roof supported by struts or columns within the cab so that its side walls may readily be removed, thereby permitting ready access to the interior.

Briefly speaking, my invention consists of providing a roof which is maintained in fixed relation with a car floor by means of vertical struts within the cab and removable side walls and upper decks. The side walls comprise a plurality of side posts, in spaced relation to each other, which have their upper ends bent inwardly and secured to the roof of the cab by means of gusset plates and bolts and side sheets and upper-deck members mounted upon and secured to the side posts. The side posts are so maintained in position by bolts or some other easily removable connecting means that they may be readily detached from the floor and the roof of the car.

For a better understanding of my invention, reference may now be had to the accompanying drawings, Fig. 1 of which is a view, in perspective, of a cab of an electric locomotive.

Fig. 2 is a view, in perspective, of a side sheet secured to side posts which are removed from the body of the cab, which is shown in Fig. 1.

Fig. 3 is a view, in perspective, of a portion of an upper-deck member which has been removed from the body of the cab, which is shown in Fig. 1.

Referring particularly to Fig. 1, a locomotive cab 1 is shown, comprising inner sills 2, vertical struts 3 and diagonal struts 4 which support a roof 5 and relatively distant from the vertical struts 3, are secured removable side posts 6 to which are secured side sheets 7 and upper-deck members 8. A lower deck or floor comprising plates 9 and side sills 10, extends horizontally to the side posts 6 and the side sheets 7.

The inner sills 2 comprise two horizontal channel bars 12 and 13 which are parallel to the sides of the cab 1, and connecting plates 14. An equipment deck, comprising horizontal plates 15, is provided to receive and support electrical apparatus. The side posts 6 are secured to the sills 10 by bolts 16 and to the gusset plates 17 and 17a by similar bolts. The side post 6 may be made of a single Z bar, an angle or a built-up section and is curved inwardly near its upper end. Carlines 18 which are parts of the roof 5, extend transversely across the car and some of them are secured to struts 3 by gusset plates 19.

The upper-deck member 8 comprises a curved plate which is secured to the car lines 18 and to the side posts 6 by means of bolts 20. Side plates or sheets 7 may be fixedly mounted upon one or more of the side posts 6 by means of rivets 21 and be detachably fastened to other side posts 6 by bolts 20.

Windows 22 are provided in some of the side sheets 7 for light and air.

The roof 5 comprises arcuate shaped plates 23 (only one being shown) which are secured to bent angle bars 24, the latter being attached to the struts 3 by means of gusset plates 25. Stiffener angle bars 26 are provided at the edges of the plate 23.

Fig. 2 shows two of the side posts 6 to which is secured a side sheet 7 by means of rivets 21, bolt holes 27 being provided in the side sheet for bolts 20.

Fig. 3 shows a portion of the upper-deck member 8 having a gutter 28 at its lower edge. A bent end portion 29 may be formed to overlap the adjacent upper-deck member 8, and bolt holes 30 are provided for securing it to the carlines 18 and side posts 6.

The arrangement shown in the drawing is such as to permit the removal of one of the upper-deck members 8 and one of the side sheets 7 without removing any of the others, it being necessary to remove the upper deck before removing the side sheet 7; although it would be possible to so design the gutter 28 of the upper deck as to permit the removal of side sheet 7 without removing the member 8.

It will be observed by those skilled in the art that, by my invention, I have provided a railway cab of relatively simple and inexpensive construction having demountable side walls and upper-deck members, thus permitting ready access to the machinery therein.

While I have shown my invention in its preferred form, it is apparent that it may be subjected to minor modifications without departing from the spirit thereof; therefore, I desire to be limited only by the scope of the appended claims.

I claim as my invention:—

1. In a railway cab, the combination with a floor, a roof and means for supporting said roof, of a side post detachably secured to said floor and to said roof and a side sheet secured to said side post.

2. In a railway cab, the combination with a floor, a roof and struts for supporting said roof, of a side post detachably secured to said floor and to said roof and a side sheet secured to said side post.

3. In a railway cab, the combination with a floor, a roof and struts for supporting said roof, of a plurality of side posts in spaced relation to each other and detachably secured to said floor and to said roof, and a side sheet secured to said side posts.

4. In a railway cab, the combination with a floor, a roof and means for supporting said roof, of a plurality of side posts relatively distant from said means and detachably secured to said floor and to said roof, and a side sheet secured to said side posts.

5. In a railway cab, the combination with a floor, a roof and vertical struts in spaced relation to each other for supporting said roof, of a plurality of side posts relatively distant from said struts and detachably secured to said floor and to said roof, and a side sheet secured to said side posts.

6. In a railway cab, the combination with a side sill, a roof and means for supporting said roof, of a side post detachably secured to said floor and to said side sill and a side sheet secured to said side post.

7. In a railway cab, the combination with a side sill, a carline and means for supporting said carline, of a side post detachably secured to said side sill and to said carline, and a side sheet secured to said side post.

8. In a railway cab, the combination with a floor, a roof and means for supporting said roof, of a side sheet, an upper-deck member and means secured to said side sheet and to said upper-deck member and detachably secured to said floor and to said roof.

9. In a railway cab, the combination with a floor, a roof and struts supporting said roof, of a side sheet, an upper-deck member and means secured to said side sheet and to said upper-deck member and detachably secured to said floor and to said roof.

10. In a railway cab, the combination with a floor, a roof and struts supporting said roof, of a plurality of side sheets, and an upper-deck member and means secured to said side sheet and to said upper-deck member and detachably secured to said floor and to said roof.

11. In a railway cab, the combination with a floor, a roof and means for supporting said roof, of a side post curved inwardly near the upper end thereof and detachably secured to said floor and to said roof and a side sheet secured to said side post.

12. In a railway cab, the combination with a floor, a roof and means for supporting said roof, of a side post bent inwardly near the upper end thereof and detachably secured to said floor and to said roof and a side sheet secured to said side post.

13. In a railway cab, the combination with a floor, a roof and means for supporting said roof, of a side post bent inwardly near the upper end thereof and detachably secured to said floor and to said roof, a side sheet secured to said side post and an upper-deck member mounted thereon.

14. In a railway cab, the combination with a floor, a roof and struts supporting said roof, of a plurality of side posts bent inwardly near the upper ends thereof and detachably secured to said floor and to said roof, a side sheet secured to said side posts and an upper-deck member mounted thereon.

15. In a railway cab, the combination with a floor, a roof and struts supporting said roof, of a plurality of side posts bent inwardly near the upper ends thereof, relatively removed from said struts and detachably secured to said floor and to said roof, a side sheet secured to said side posts and an upper-deck member mounted thereon.

In testimony whereof, I have hereunto subscribed my name this 14th day of June 1920.

VICTOR J. SHEPARD.